United States Patent [19]

Ollivier

[11] Patent Number: 5,445,321
[45] Date of Patent: Aug. 29, 1995

[54] ANTI-HAIL SHOCK WAVE GENERATOR

[76] Inventor: Gérald Ollivier, 1625 Lincoln Avenue, #1901, Montreal, Canada, H3H 2T5

[21] Appl. No.: 138,589
[22] Filed: Oct. 18, 1993
[51] Int. Cl.[6] .............................................. A01G 15/00
[52] U.S. Cl. ...................................... 239/14.1; 239/99
[58] Field of Search ................... 239/14.1, 2.1, 589, 239/99; 431/1, 19

[56] References Cited

U.S. PATENT DOCUMENTS

| | | |
|---|---|---|
| 684,030 | 10/1901 | Wright . |
| 2,192,471 | 3/1940 | Harbison . |
| 2,815,982 | 12/1957 | Bleamaster . |
| 2,968,713 | 1/1961 | Harper . |
| 3,362,915 | 1/1968 | Micek . |
| 3,645,446 | 2/1972 | Patten . |
| 3,732,057 | 5/1973 | Lipper et al. ........................... 431/10 |
| 3,848,801 | 11/1974 | Ollivier et al. .................. 239/14.1 X |
| 3,969,842 | 7/1976 | Velie . |
| 4,080,149 | 3/1978 | Wolfe ........................................ 431/1 |
| 4,355,970 | 10/1982 | Kitagawa et al. ................. 431/19 X |
| 4,527,125 | 7/1985 | Miyanaka et al. ................. 431/19 X |
| 4,767,313 | 8/1988 | Lockwood ................................ 431/1 |
| 4,835,359 | 5/1989 | Sciortino . |
| 5,044,929 | 9/1991 | Tabuchi et al. ..................... 431/19 X |
| 5,118,281 | 6/1992 | Biamleffe et al. ................ 431/75 X |

FOREIGN PATENT DOCUMENTS

| | | |
|---|---|---|
| 52-62943 | 5/1977 | Japan . |
| 144506 | 7/1985 | Japan ....................................... 431/75 |
| 1012056 | 12/1965 | United Kingdom . |

Primary Examiner—Andres Kashnikow
Assistant Examiner—Kevin P. Weldon
Attorney, Agent, or Firm—Merchant, Gould, Smith, Edell, Welter & Schmidt

[57] ABSTRACT

The shock wave generator has a combustion control system including a pressure transducer for detecting whether an explosion in the combustion chamber takes place. When combustion is weak, as may be the case when the chamber is particularly wet or cold, extra fuel is added. If no explosion is detected, there is a failure and continued fuel injection is stopped. If normal explosions are not detected after injecting extra fuel a number of times, continued fuel injection and operation is stopped.

1 Claim, 2 Drawing Sheets

ANTI-HAIL SHOCK WAVE GENERATOR

FIELD OF THE INVENTION

The present invention relates to an anti-hail shock wave generator having an improved combustion control system.

BACKGROUND OF THE INVENTION

An anti-hail shock wave generator or cannon is known in the art from U.S. Pat. No. 3,848,801. In such a device, a shock wave is generated by detonating an explosive mixture of combustible gas and air in a combustion chamber having an upper orifice. A conical barrel is fit over the upper orifice and directs the shock wave resulting from the explosion upwardly to the sky. By firing the generator at regular intervals (eg. less than 25 seconds, and usually every 8 to 14 seconds), a succession of shock waves are created which disrupts the internal microstructure of the clouds to prevent the formation of hail nuclei within a small area (typically a 500 m radius) over the generator. It is believed that transport of positive ions from ground level to cloud level by the succession of shock waves is largely responsible for the disruption of the formation of hail nuclei.

By using the known device, crop damage due to hail has been known to be completely eliminated or at least significantly reduced without any adverse environmental effects, however, to achieve good results, special care must be taken to operate the device properly starting about 15-25 minutes before a hail storm in order to disrupt sufficiently the hailstone formation process. By operating the device at a faster firing rate, the combustion chamber and the barrel are subjected to more mechanical and temperature stress, and more fuel is consumed.

SUMMARY OF THE INVENTION

It is an object of the present invention to provide an anti-hail shock wave generator with automatic ignition control which ensures repeated ignition in the combustion chamber even under adverse conditions.

According to the invention there is provided an anti-hail shock wave generator comprising a combustion chamber having an upper orifice, fuel injection means for injecting fuel into the chamber, ignition means for igniting the fuel in the chamber, a conical barrel having a small diameter lower end connected to the upper orifice and a large diameter upper end, detection means for detecting an explosion in the chamber, control means connected to the detection means, the fuel injection means and the ignition means for injecting an increased amount of fuel when the detection means indicated that no explosion has resulted from a previous ignition and for igniting the increased amount of fuel in the chamber.

BRIEF DESCRIPTION OF THE DRAWINGS

The invention will be better understood by way of the following detailed description of a preferred embodiment with reference to the appended drawing in which.

DETAILED DESCRIPTION OF THE PREFERRED EMBODIMENT

Figure 1:
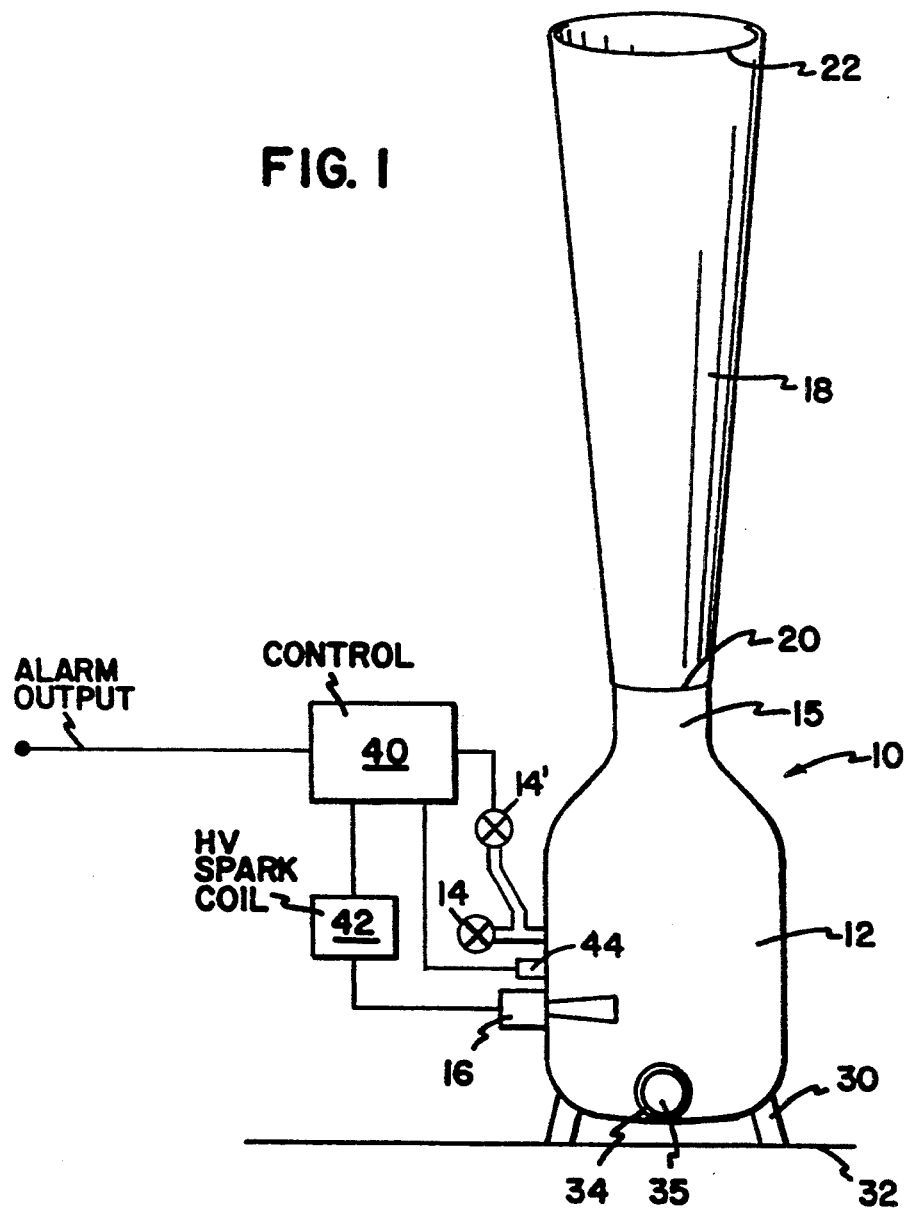
FIG. 1 is a side view of the anti-hail shock wave cannon according to the preferred embodiment.

As shown in FIG. 1, cannon (10) comprises a combustion chamber (12) which may comprise a substantially cylindrical body with a rounded bottom and a rounded top portion which leads into a neck (15). The bottom of combustion chamber (12) is solidly mounted to a concrete pad (32) by feet (30). One or more air inlet ports (34) are provided with flaps (35) which are seated in ports (34) and open inwardly to provide one way valves for air rushing into chamber (12) after each ignition. Chamber (12) is provided with a fuel injector (14) which may comprise a solenoid valve controlling flow of acetylene gas from an acetylene gas reservoir (not shown) into a central portion of chamber (12). Ignition means (16) are provided for igniting the acetylene gas injected into chamber (12), and ignition means (16) comprise spark gap electrodes and a high voltage generator coil (42). The spark gap generator coil (42) and solenoid valve (14) are controlled by control means (40). A conical barrel (18) has a large diameter upper end (22) and a small diameter lower end (20) which is connected to an upper orifice in neck (15) of chamber (12).

When the shock wave generator cannon (10) is operated, control means (40) cause gas to be released through solenoid valve (14) into chamber (12) until sufficient gas for a full explosion resulting in a significant shock wave is present in chamber (12). Mixing of the acetylene gas with air in chamber (12) is automatic and rapid. A short time after solenoid valve (14) is closed, control means (40) trigger spark gap coil (42) to create a high voltage pulse resulting in a spark across the electrodes of ignition means (16). As the gas in chamber (12) rapidly combusts, a shock wave results which is directed by conical barrel (18). The momentum of the combustion gases is directed upwardly, and once the combustion gases have fully expanded, the upward momentum of the gases causes a negative pressure to be created in the combustion chamber (12) which results in flap (35) being drawn open so that fresh air may be drawn from ambient through port (34) to fill combustion chamber (12).

It is important to select a fuel and ignition system which can operate even when rain water passes through barrel (18) into chamber (12). It is important to select the parameters of fuel, combustion chamber volume to upper orifice size as well as barrel (18) dimensions in order that a good shock wave is generated and sufficient aspiration through ports (34) takes place in order to bring in sufficient fresh air for the next combustion.

Figure 2:
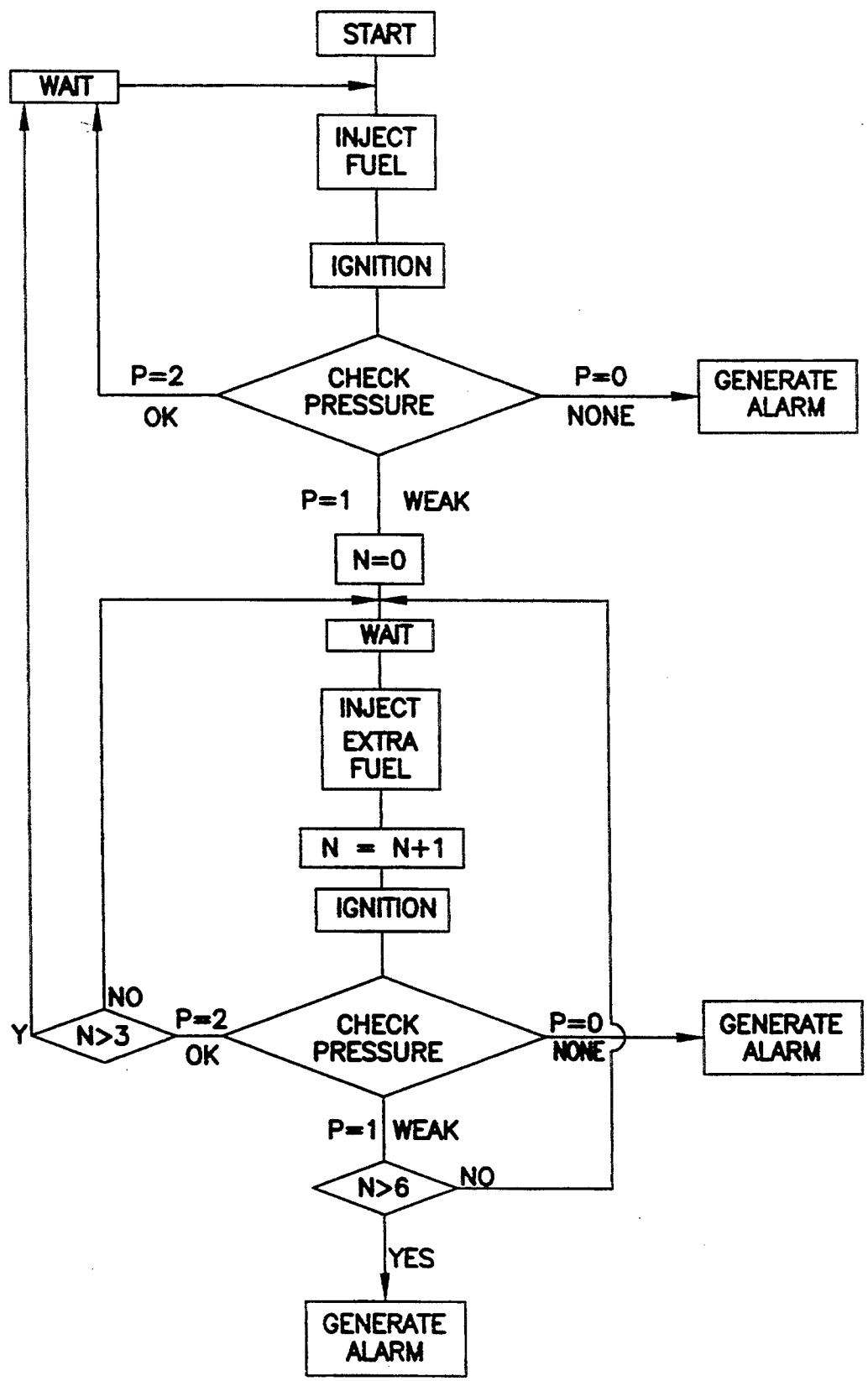
FIG. 2 is a flow chart of the combustion control according to the preferred embodiment.

However, even when the above mentioned parameters are well selected, the shock wave generator (10) can have difficulty producing consistently good shock waves under extreme weather conditions, as is usually prevalent during hail storms. According to the invention, the control means (40) follows the control procedure illustrated in FIG. 2, wherein after each ignition trigger, the signal generated by sensor (44) is checked. Sensor (44) generates a first signal when the pressure generated reaches a first threshold and a second signal when the pressure generated reaches a second higher threshold. The first threshold indicates a weak or poor combustion, whereas the second threshold indicates a normal or good combustion. As long as the sensor (44) generates the second signal, injection and ignition continue at regular intervals until the program is to be stopped.

However, if a weak combustion is detected, the control means (40) causes an additional amount of fuel to be used. In the preferred embodiment, this is done by opening solenoid control valve (14') which is supplied with acetylene gas at twice the normal pressure. In this way, the extra fuel is supplied in the same amount of time, and therefore no change in the ignition control timing cycle is required. Extra fuel can be added, however, by increasing injection time, namely twice as long, or by injecting fuel from more than one injector supplied with gas under the same pressure. Extra fuel is injected for a minimum of 3 times whether or not the second signal is generated. If however the second signal is not generated after 3 time, then the extra fuel injection continues until the second signal is detected up to an additional 3 cycles, after which an alarm signal is generated. If at any time there is no signal generated by the sensor (44), it is presumed that there is a serious failure, and an alarm signal is generated. In both of the above alarm cases, shut down of the generator (10) is necessary.

Sensor (44) can be a conventional diaphragm type pressure sensor, although more sophistocated sensors could also be used. While a discrete output signal sensor has been proposed, a variable output signal sensor could also advantageously be used. It is also sufficient that the output signal indicate only one pressure condition, namely good combustion. It is also possible to detect whether air inlet flaps (35) have been sucked in by appropriate motion detectors in order to determine whether failed combustion has occurred. If the flaps (35) have failed to move, further injection of fuel can result in an overly rich air/fuel mixture which would only poorly combust, if at all. In such a case, the control means (40) can be programmed to wait, ignite without injecting fuel and/or generate an alarm signal. The alarm output signal can be connected to radio transmitter to inform a remote operator of the problem.

The preferred material for combustion chamber (12) is steel having a wall thickness of 0.6 to 1.0 cm. Ports (34) are preferably two in number and have a diameter of about 15 cm. The height of barrel (18) is about 4 m, its upper opening diameter is about 80 cm and its lower opening diameter is about 10 to 14 cm. The combustion chamber has an internal diameter of about 45 cm and a volume of about 160 to 180 liters. The volume of acetylene gas injected is about 5 to 10 liters and the recommended time period between ignitions is 3.5 to 6 seconds.

Although the invention has been described above with reference to the example of the preferred embodiment, it is to be understood that other embodiments are contemplated by the invention as defined in the appended claims.

I claim:

1. An anti-hail shock wave generator comprising:
    a combustion chamber having an upper orifice, a conical barrel having a small diameter lower end connected to the upper orifice, and a large diameter upper end;
    injection means for periodically providing gaseous fuel in the chamber according to two different fuel pressures, the fuel being injected at both pressures during a substantially identical injection time, the pressures being such that the fuel injected at the higher fuel pressure is substantially twice the amount of fuel injected at the lower fuel pressure;
    ignition means for igniting the fuel in the chamber following an injection of fuel;
    detection means comprising dual pressure sensors for generating a first or a second signal after an ignition of the fuel, the first signal being generated upon measure of a pressure in the chamber equal or less than a threshold pressure corresponding to a weak explosion, and the second signal being generated upon measure of a pressure in the chamber higher than the threshold pressure;
    control means connected to the detection means and responsive to the first or second signal, the control means further comprising computer means for counting subsequent cycles, each cycle being defined by an injection followed by an ignition, the control means being connected to the injection means so that fuel pressure is changed from the lower fuel pressure to the higher fuel pressure upon reception of the first signal by the control means, and changed from the higher fuel pressure to the lower fuel pressure only after a minimum number of subsequent cycles during which the control means receives the second signal.

* * * * *